Dec. 27, 1949  H. W. BODE  2,492,351
SMOOTHING NETWORK
Filed Feb. 23, 1944

INVENTOR
H. W. BODE
BY
W. H. Dawson
ATTORNEY

Patented Dec. 27, 1949

2,492,351

UNITED STATES PATENT OFFICE 2,492,351

SMOOTHING NETWORK

Hendrik W. Bode, New York, N. Y., assignor to Bell Telephone Laboratories, Incorporated, New York, N. Y., a corporation of New York Application February 23, 1944, Serial No. 523,510

3 Claims. (Cl. 178—44)

1

This invention relates to smoothing systems, and particularly to systems in which the variations in some physical phenomenon are represented by variations in a quantity of energy.

In many measuring systems, the steady change in some natural phenomenon is measured, and from this measurement the rate of change of the phenomenon is obtained. The phenomenon measured may be any natural phenomenon which is changing at a substantially steady rate, such as the unaccelerated motion of a body, the variation in the length, weight, temperature or other property of a substance, or similar change. The observations of the phenomenon control the quantity of energy drawn from a suitable source; and, though the energy drawn from the source thus is proportional to the change in the phenomenon, this quantity of energy will also have undesired perturbations due to observational errors and defects in the measuring system. In accordance with the present invention, the quantity of energy proportional to the rate of change of the phenomenon is supplied to a system which smooths this quantity of energy to reduce the undesired perturbations and weights the vaules of the energy by the method of least squares.

The object of the invention is a network or filter which modifies the quantity of energy to produce a second quantity of energy proportional to the rate of change in the first quantity, smooths the perturbations in this second quantity of energy due to observational inaccuracies and undesired variations, and weights the results of the observations.

A feature of the invention is a network which weights successive values of the second quantity of energy in accordance with a function which varies from zero at the terminus of a past time interval through a maximum to zero at the present time. The variation in the function may be approximately parabolic.

In the drawings:

Fig. 1 shows the geometrical relationships for a typical physical phenomenon;

Fig. 2 diagrammatically shows a system for computing certain values from observations of the phenomenon of Fig. 1;

The target is moving along a course T0T and is continuously under observation from some observation station O. The angular height $E_0$ of the target above a horizontal plane, and the angle of azimuth $A_0$ of the target from some selected direction ON are continuously measured by the usual instruments, such as a theodolite or radio location device. The slant distance $OT_0$, designated $r_0$, is continuously measured by known means, such as a range finder, radio apparatus, or by triangulation. For unaccelerated motion of the target, the rates of change of the polar coordinates $E_0$, $A_0$, $r_0$, of the target will not usually be constant, and cannot easily be smoothed. The polar coordinates $E_0$, $A_0$, $r_0$, thus are first transformed into a system of rectilinear coordinates $x_0$, $y_0$, $v_0$, in which the rates of change of the coordinates theoretically are constant.

Figure 2:
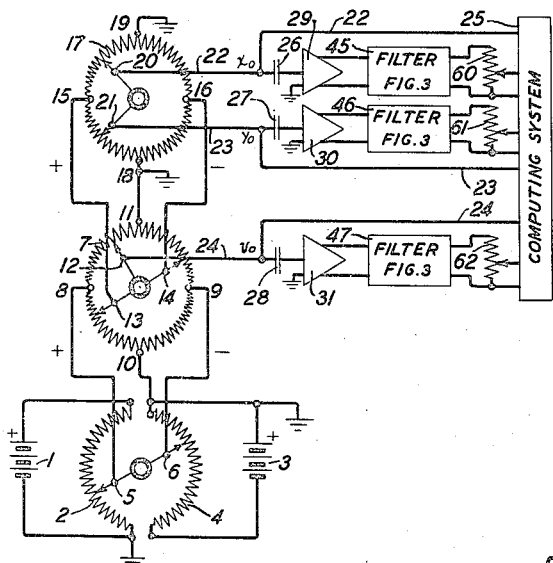

In Fig. 2 a source of voltage 1 such as a battery, generator or rectified and filtered power supply, with the negative pole grounded, is connected across the potentiometer winding 2. Another source of voltage 3, with the positive pole grounded, is connected across the potentiometer winding 4. The brushes 5, 6 are insulated from each other and from ground, and are rotated in a clockwise direction, either manually or by known automatic devices, in accordance with the observed values, to select voltages with respect to ground, respectively positive and negative, proportional to $r_0$, the slant distance to the target.

The brush 5 is connected to a tap 8 in the potentiometer winding 7, and the brush 6 is connected to a diametrically opposite tap 9 in the same winding. The equidistant, intermediate points 10, 11 of the potentiometer winding 7 are grounded. The potentiometer winding 7, as schematically shown, has an approximately sinusoidal variation in resistance. The brushes 12, 13, 14 are insulated from each other and from ground and are rotated, either manually or by known automatic devices, in accordance with the observed values of the angular height $E_0$.

Figure 1:
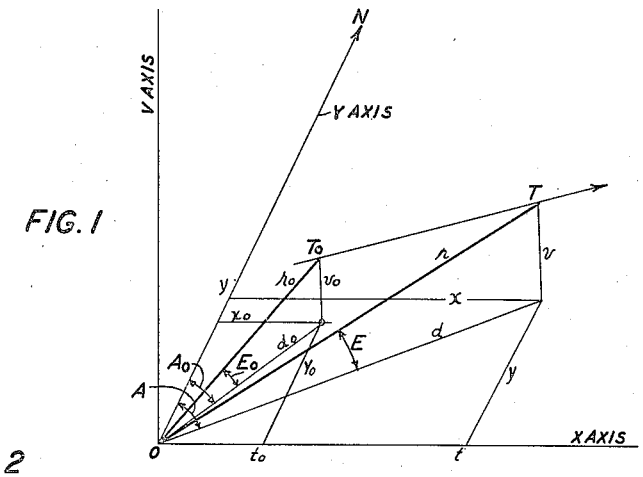
Fig. 1 shows the geometrical relationships for a typical physical phenomenon, the movement in three-dimensional space of a target, such as an aerial vehicle, an airplane, airship, etc.

From Fig. 1, $v_0 = r_0 \sin E_0$, thus the brush 12 is rotated clockwise from zero angle at the point 10, to select a voltage with respect to ground, proportional to $r_0 \sin E_0$.

From Fig. 1, the horizontal distance $$d_0 = r_0 \cos E_0$$

thus the brushes 13, 14 are located 90 degrees from the brush 12, and respectively select positive and negative voltages with respect to ground proportional to $r_0 \cos E_0$.

The brushes 13, 14 are respectively connected to diametrically opposite taps 15, 16 in the potentiometer winding 17. The equidistant, intermediate points 18, 19 of the winding 17 are grounded. The potentiometer winding 17 also has an approximately sinusoidal variation of resistance.

From Fig. 1, $x_0 = d_0 \sin A_0$ and $y_0 = d_0 \cos A_0$. The brushes 20, 21 are rotated, either manually or by known automatic devices, clockwise from zero angle at point 18 in accordance with the observed values of the angle $A_0$, to select voltages with respect to ground respectively proportional to $x_0$ and $y_0$.

The potentiometer windings 2, 4, 7, 17 may be in the form of cards of suitable material having one straight edge, the other edge being cut to the proper shape, closely and evenly wound with resistance wire which is cleaned along the straight edge to make a good contact with the brushes.

The voltages proportional to the observed values, $x_0$, $y_0$, $v_0$, of the rectangular coordinates of the position of the target $T_0$, are supplied by connections 22, 23, 24 to any suitable utilization means, such as a known computing system 25. As many such computing systems are known, such as the systems shown in United States Patent 2,408,081, September 24, 1946, C. A. Lovell et al., and United States application Serial No. 443,920, filed May 21, 1942, by W. H. Boghosian et al., both assigned to the assignee of the present application, a detailed description of such a system in the present application is not necessary.

Assume that, since the time $t_0$ in the past the target has been continuously observed, and has moved during a time interval $t_1$ ending at the present time $t$ at the component velocities $\dot{x}_0$, $\dot{y}_0$, $\dot{v}_0$, where $\dot{x}_0$, etc. represent the time derivatives of the movement. The true course of the target is given by $x_0 + \dot{x}_0 t_1$, $y_0 + \dot{y}_0 t_1$, $v_0 + \dot{v}_0 t_1$, the true coordinates of the position of the target at the time $t$ are $x$, $y$, $v$, and the observed coordinates are $x_1$, $y_1$, $v_1$. The observed results are to be averaged over a time interval T, that is, over the past time interval from $t-T$ to $t$, the present time. Of course, as time passes and $t$ assumes new values, the past time interval $t-T$, though of constant length, will move with $t$ to include new values of the data, and exclude old values.

The observers will not be able to follow the movement of the target with perfect accuracy. Thus the observed results will have observational perturbations which should be averaged. The errors may be assumed to be random in distribution, thus the integral of the squares of the vector errors $(x-x_1)$, $(y-y_1)$, $(z-z_1)$ should be a minimum.

Thus, the integral, over the past time interval from the present time $t$ to the past time $t-T$, $$I = \int_{t-T}^{t} [(x-x_1)^2 + (y-y_1)^2 + (v-v_1)^2] dt_1 \quad (1)$$

in which $t_1$ is the variable of integration, should be a minimum.

For convenience, this discussion may be limited to the $x$ coordinate, as similar results will be obtained for $y$ and $v$.

For the target course assumed, Equation 1 becomes $$I = \int_{t-T}^{t} (x_0 + \dot{x}_0 t_1 - x_1)^2 dt_1 \quad (2)$$

and this integral is to be a minimum, that is $$\frac{\partial I}{\partial x_0} = \frac{\partial I}{\partial \dot{x}_0} = 0$$

Thus $$x_0 = \frac{1}{T} \int_{t-T}^{t} x_1 dt_1 - \dot{x}_0 \left( t - \frac{T}{2} \right) \quad (3)$$

and $$x_0 \left( t - \frac{T}{2} \right) = \frac{1}{T} \int_{t-T}^{t} (x_1 t_1) dt_1 - \dot{x}_0 \left[ t^2 - tT + \frac{T^2}{3} \right] \quad (4)$$

As $\dot{x}_0$ is of present interest, $x_0$ may be eliminated, and as the integration in Equations 1, 2, 3, 4 is performed from the past time $t-T$ to the present time $t$, whereas it is more convenient to integrate from the present time $t$ over the past time interval T, for convenience, $t_1$ may be replaced by $u = t_1 - t + T$ where the quantity $u$ represents time extending into the past from the time of observation $t$.

Thus, from Equations 3 and 4

$$\dot{x}_0 = \frac{12}{T^3} \int_0^T x_1 \left( u - \frac{T}{2} \right) du \quad (5)$$

By integration by parts, Equation 5 becomes $$\dot{x}_0 = \frac{6}{T^3} \int_0^T \dot{x}_1 (u^2 - uT) du \quad (6)$$

Equation 6 shows the type of weighted average $\overline{\dot{x}_1}$, $\overline{\dot{y}_1}$, $\overline{\dot{v}_1}$, desired for the derivatives $\dot{x}_1$, $\dot{y}_1$, $\dot{v}_1$ of the observed coordinates $x_1$, $y_1$, $v_1$. By comparing Equation 6 with the superposition integral, it is found that a network which will perform this averaging operation must have an indicial admittance which satisfies $$T\dot{A}(t) = 6 \left[ \frac{t}{T} - \left( \frac{t}{T} \right)^2 \right] \quad (7)$$

and $$A(t) = 3 \left( \frac{t}{T} \right)^2 - 2 \left( \frac{t}{T} \right)^3 \quad (8)$$

Equation 7 when plotted against the ratio $t/T$ is a section of a parabola, and the weighting function $(u^2 - uT)$ of Equation 6 when plotted against $u/T$ is also a section of a parabola.

The values of $x_1$ must be differentiated to produce the value $\dot{x}_1$ and then smoothed by some network. The weighting function $(u^2 - uT)$ may be interpreted as the response of the smoothing network only to an impulse of unit area and negligible width, or as the response of the differentiator and network to a unit step function, that is, a suddenly applied voltage of constant unit amplitude.

Figure 4:
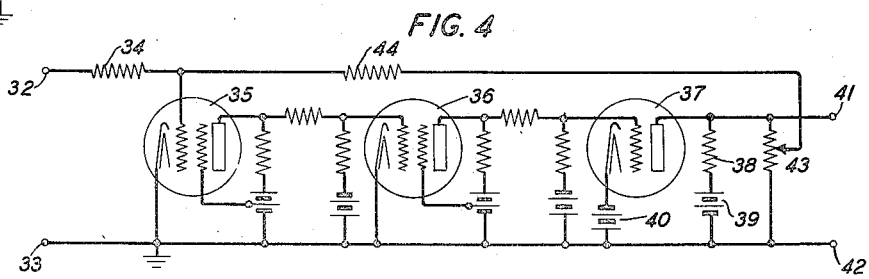
Fig. 4 shows an amplifier used in Fig. 2.

In Equation 6, it is the time derivative $\dot{x}_1$ of the observed value $x_1$ which is to be averaged and weighted by the network or filter to give the smoothed values $\overline{\dot{x}_1}$. The connections 22, 23, 24, respectively, apply voltages proportional to $x_1$, $y_1$, $v_1$ to the capacitors 26, 27, 28 connected to the input circuits of the amplifiers 29, 30, 31 which may be of the type disclosed in U. S. Patent 2,401,779, June 11, 1946, K. D. Swartzel, Jr., as shown in Fig. 4. The currents from the capacitors 26, 27, 28 are respectively proportional to the time rates of change of the applied voltages, that is, to $\dot{x}_1$, $\dot{y}_1$, $\dot{v}_1$.

In Fig. 4, the input terminal 32 is connected through resistor 34 to the control electrode of vacuum tube 35. The grounded input terminal 33 is connected to the cathode of vacuum tube 35. The output circuit of vacuum tube 35 is connected by any suitable interstage coupling network, such as the network shown in U. S. Patent 1,751,527, March 25, 1930, H. Nyquist, to the input circuit of vacuum tube 36. The output circuit of vacuum tube 36 is similarly connected to the input circuit of vacuum tube 37. Power is supplied in the usual manner to the anodes, screen grids and heaters (not shown).

Power is supplied by a suitable source 39 through resistor 38 to the anode circuit of vacuum tube 37. A suitable source of power 40 has the negative pole connected to the cathode of vacuum tube 37 and the positive pole grounded. The potentials of the sources 39, 40 and the resistance of resistor 38 are selected so that, in the absence of a signal voltage applied to the amplifier, the sources 39, 40, and the resistances of the resistor 38 and the anode-cathode path of vacuum tube 37 form a balanced bridge, thus no voltage is applied to the output terminals 41, 42. When a signal voltage is applied to the amplifier and the amplified voltage is applied to the control electrode of vacuum tube 37, the anode-cathode resistance of vacuum tube 37 is changed, unbalancing the bridge and producing a voltage across the output terminals 41, 42. As the amplifier has an odd number of stages, the voltage produced across the output terminals 41, 42 is opposite in polarity to the voltage applied to the input terminals 32, 33.

The winding of potentiometer 43 may be connected across the output terminals 41, 42, and the brush connected through resistor 44 to supply reverse feedback to the input circuit of the amplifier. In some cases potentiometer 43 may be omitted and the feedback connection may be made directly to the anode of vacuum tube 37.

If $e$ be the voltage applied to capacitor 26, $C$ the capacitance of capacitor 26, $r$ the resistance of resistor 34, $R$ the resistance of resistor 44, $\mu$ the voltage amplification of the amplifier, $e_0$ the voltage developed across the winding of potentiometer 43, $k$ the fraction of this voltage selected by the brush and $p$ the usual operational symbol for a time derivative, it may be shown that $$e_0 = -\frac{1}{k}\left[\frac{\frac{RC}{1+\frac{1}{\mu}}}{1+\left(r+\frac{R}{1+\mu}\right)Cp}\right]pe \quad (9)$$

With modern vacuum tubes, $\mu$ may easily be made large, thus $$e_0 = -\frac{1}{k}\left[\frac{RC}{1+rCp}\right]pe \quad (10)$$

If the target were moving in a straight line at constant speed, and the observed values were accurate, then $e_0$ would be a linear function of time, the time derivatives of the movements in the three coordinates would be constant and the voltages supplied the networks 45, 46, 47 would be proportional to $\dot{x}_0, \dot{y}_0, \dot{v}_0$. In general, the observed values $x_1, y_1, v_1$ are not quite accurate, thus $e_0$ is not quite a linear function of time, and the operator $$\left[\frac{RC}{1+rCp}\right]$$

introduces some smoothing of the derivatives of the observed values. This initial smoothing may be taken into account in the design of the smoothing network. The voltages supplied to the smoothing networks thus are partially smoothed values of $\dot{x}_1, \dot{y}_1, \dot{v}_1$. The combinations of capacitor 26, amplifier 29, filter 45, potentiometer 60; capacitor 27, amplifier 30, filter 46, potentiomer 61; capacitor 28, amplifier 31, filter 47, potentiometer 62, respectively form transmission means connecting the sources of energy to the utilization means 25.

For a smoothing network having any arrangement of inductors, capacitors and resistors, the transient characteristic corresponding to a unit step function may be of the form $$f(t) = A_0 + A_1 e^{-a_1 t} + A_2 e^{-a_2 t} + \ldots - \quad (11)$$

The transient response corresponding to a unit impulse is the derivative of the above, or $$f'(t) = -A_1 a_1 e^{-a_1 t} - A_2 a_2 e^{-a_2 t} - \ldots \quad (12)$$

In a general network, the $a$'s may be real or complex. In a smoothing circuit, it is seldom possible to use inductors, as the values of inductance or effective resistance often are impractical, thus capacitor-resistor networks are of principal interest. In networks of this type, the $a$'s in Equations 11 and 12 are all positive real quantities.

In Equations 11 and 12 it is assumed that the roots of the characteristic determinant of the system are all distinct. If some of the roots are equal, the expression takes a different form. For example, if there are $n$ roots all equal to $a$, Equation 11 is replaced by $$f(t) = (A_0 + A_1 t + A_2 t^2 + \ldots + A_{n-1} t^{n-1}) e^{-at} \quad (13)$$

No exact technique is known for establishing the values of the $A$'s and $a$'s in Equations 11, 12, 13. One method is to first assume coincident roots, and, using the desired conditions for settling time, determine $a$ from Equation 13. Then, by polynominal approximations, the $A$'s may be determined.

The coincident root solution frequently leads to extreme values of the elements in the network. Non-coincident roots may then be chosen, more or less centered about the coincident roots. The selected values of $a$ are introduced into Equation 11, and values of the $A$'s chosen to fit a desired number of points on the parabolic characteristic. Frequently, these first values of $a$ and $A$ will produce a characteristic with a rather long and slowly varying tail, having current values which are too small to materially aid the smoothing, but too large for desired accuracy, thus requiring a long wait before the values may be used in the prediction. The characteristic may then be shortened by modifying the values of the $A$'s and contracting the characteristic to bring the tail within the desired settling time, thus producing a characteristic which, outside the weighting interval, is zero and stays zero with considerable accuracy.

In a typical network, Equation 12 had the following values:

$$f(t) = .3924 e^{-1.2t} - 6.1104 e^{-2.4t} +$$
$$20.394 e^{-3.6t} - 14.676 e^{-6.0t} \ldots \quad (14)$$

Equation 11 may also be written in the following form:

$$f(t) = (A_0 + A_1 + A_2 + \ldots - A_n) -$$
$$A_1(1 - e^{-a_1 t}) - A_2(1 - e^{-a_2 t}) - \ldots \quad (15)$$

Figure 3:
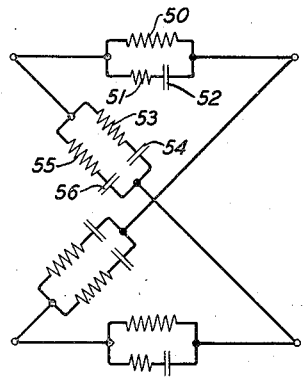
Fig. 3 shows a network or filter used in Fig. 2.

Physically, this characteristic may be realized initially by a lattice or bridge type network, having "positive" terms in the series arms, and "negative" terms in the lattice arms, depending upon the signs of the $A$'s. Thus, the term $(A_0 + A_1 + \ldots -)$ of Equation 15 corresponds to a simple resistance, represented by the resistor 50 of Fig. 3. The terms of the form $A_1(1 - e^{a_1 t})$ are simple combinations of resistance in series with capacitance, and, if positive, are represented by combinations in the series arms, such as resistor 51 and capacitor 52, and, if negative, by combinations in the lattice arms, such as resistor 53 and capacitor 54, or resistor 55 and capacitor 56. The lattice is completed by identical series and lattice arms.

After the design of the lattice network has been completed, the lattice network may be transformed into an unbalanced network, such as a bridged-T network, by the methods set forth in my prior Patents 1,944,209, January 23, 1934; 2,029,698, February 4, 1936; and 2,058,210, October 20, 1936.

The output circuits of the filters or networks 45, 46, 47 are respectively connected, if desired, through amplifiers of the type shown in Fig. 4, to the windings of potentiometers 60, 61, 62. The brushes of potentiometers 60, 61, 62 are adjusted manually or by known automatic means, to select voltages proportional to any desired time interval, such as the time of flight $\Delta t$, of a shell traveling from the point of observation to the target and thus to supply to the computer 25 voltages proportional to the smoothed and weighted values of the predicted increments $\dot{x}_1 \Delta t$, $\dot{y}_1 \Delta t$, and $\dot{v}_1 \Delta t$, in the rectangular coordinates of the position of the target.

While, for convenience, the invention has been disclosed as embodied in a typical electrical system, the invention is not limited to the specific system shown nor to electrical systems. The analogies between electrical and mechanical systems are well known, and the present invention may easily be applied to mechanical systems to determine the constants of a mechanical transmission which will produce a smoothed and weighted average of a mechanical movement.

What is claimed is:

1. Means for producing a current proportional to a smoothed weighted average of the rate of change of a voltage nominally varying at a constant rate but having undesired perturbations, comprising a capacitor connected to the source of said voltage, a feedback amplifier connected to have low impedance input and output circuits, a resistor connecting said capacitor to said input circuit, and a network connected to said output circuit comprising series and shunt arms formed of dissipative and reactive elements so proportioned that the indicial admittance of said means varies from zero through a maximum to zero in a predetermined time interval.

2. Means for producing a current proportional to a smoothed weighted average of the rate of change of a voltage nominally varying at a constant rate but having undesired perturbations, comprising a capacitor connected to the source of said voltage, a feedback amplifier connected to have low impedance input and output circuits, a resistor connecting said capacitor to said input circuit, and a network connected to said output circuit having the characteristics of a lattice network with series and lattice arms made up of resistive and capacitative elements so proportioned that the indicial admittance of the circuit connected to said capacitor varies as the expression $$A_1 e^{-a_1 t} A_2 e^{-a_2 t} + A_3 e^{-a_3 t} - A_4 e^{-a_4 t}$$

in which the $A$'s are respectively the admittances of the resistive elements of the arms, and the $a$'s are respectively the time constants of the arms.

3. Means for producing a current proportional to a smoothed weighted average of the rate of change of a voltage nominally varying at a constant rate but having undesired perturbations, comprising a capacitor connected to the source of said voltage, a feedback amplifier connected to have low impedance input and output circuits, a resistor connecting said capacitor to the input circuit, and a network connected to the output circuit having electrical characteristics equivalent to a lattice network with series arms formed of a resistor in parallel relationship with the serial combination of a resistor and a capacitor, and lattice arms formed of the serial combination of a resistor and a capacitor in parallel relationship with another serial combination of a resistor and a capacitor, said resistors and capacitors being so proportioned that the indicial admittance of said means varies from zero through a maximum to zero in a predetermined time interval.

HENDRIK W. BODE.

REFERENCES CITED

The following references are of record in the file of this patent:

UNITED STATES PATENTS

| Number | Name | Date |
| --- | --- | --- |
| 1,935,569 | Keogh | Nov. 14, 1933 |
| 2,070,178 | Pottenger | Feb. 9, 1937 |
| 2,133,687 | Drake | Oct. 18, 1938 |
| 2,222,172 | Dimmick | Nov. 19, 1940 |
| 2,244,369 | Martin | June 3, 1941 |
| 2,352,953 | Haight | July 4, 1944 |
| 2,377,898 | Myers | June 12, 1945 |
| 2,378,910 | Chaffee et al. | June 26, 1945 |
| 2,399,726 | Doyl | May 7, 1946 |
| 2,435,195 | Bomberger et al. | Feb. 3, 1948 |